US012658822B2

(12) United States Patent
Luo et al.

(10) Patent No.: US 12,658,822 B2
(45) Date of Patent: Jun. 16, 2026

(54) DYNAMIC SWITCHING SPEED CONTROL TO REDUCE LOSS, BEARING CURRENT AND ELECTROMAGNETIC INTERFERENCE

(71) Applicant: GM Global Technology Operations LLC, Detroit, MI (US)

(72) Inventors: Yilun Luo, Ann Arbor, MI (US); Khorshed Mohammed Alam, Canton, MI (US); Dhanya Sankaran, West Bloomfield Township, MI (US); Muhammad Hussain Alvi, Troy, MI (US); Junghoon Kim, Carlisle, OH (US); Rashmi Prasad, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 354 days.

(21) Appl. No.: 18/467,080

(22) Filed: Sep. 14, 2023

(65) Prior Publication Data

US 2025/0096701 A1 Mar. 20, 2025

(51) Int. Cl.
| | |
|---|---|
| *H02M 1/08* | (2006.01) |
| *B60L 50/51* | (2019.01) |
| *H02M 1/00* | (2006.01) |
| *H02M 1/32* | (2007.01) |
| *H02M 1/44* | (2007.01) |
| *H02M 7/5387* | (2007.01) |

(52) U.S. Cl.
CPC ......... *H02M 7/53871* (2013.01); *B60L 50/51* (2019.02); *H02M 1/0025* (2021.05); *H02M 1/44* (2013.01); *B60L 2210/42* (2013.01)

(58) Field of Classification Search
CPC .......................... H02M 1/08–088; H02M 1/32
See application file for complete search history.

(56) References Cited

U.S. PATENT DOCUMENTS

| | | | | |
|---|---|---|---|---|
| 6,717,785 B2 * | 4/2004 | Fukuda | .............. | H03K 17/0828 |
| | | | | 361/86 |
| 9,960,692 B2 * | 5/2018 | Iorio | ................. | H02M 3/33523 |
| 10,491,095 B2 * | 11/2019 | Chen | ...................... | B60L 1/003 |
| 10,911,045 B1 * | 2/2021 | Ming | ..................... | H03K 17/145 |
| 11,552,632 B1 * | 1/2023 | Chen | ...................... | H03K 5/12 |
| 11,695,409 B2 * | 7/2023 | Sakai | ............... | H03K 17/08128 |
| | | | | 327/109 |

(Continued)

FOREIGN PATENT DOCUMENTS

JP 2016073051 A * 5/2016

*Primary Examiner* — Sisay G Tiku
(74) *Attorney, Agent, or Firm* — CANTOR COLBURN LLP

(57) ABSTRACT

A vehicle includes a system for controller the vehicle. The vehicle includes a motor. The system includes an inverter, and a gate controller. The inverter has a switch for controlling current to the motor. The gate controller is configured to apply a gate current to the switch at a first on-current control level during a first switch-on stage of a turn-on operation of the switch, lower the gate current to a second on-current control level less than the first on-current control level during a second switch-on stage of the turn-on operation, and raise the gate current to a third on-current control level during a third switch-on stage of the turn-on operation, wherein the third on-current control level is greater than the second on-current control level.

20 Claims, 10 Drawing Sheets

(56) References Cited

U.S. PATENT DOCUMENTS

2011/0133790 A1* 6/2011 Nagata ................. H03K 17/168
327/109
2023/0261653 A1* 8/2023 Horiguchi ........ H03K 17/04206
327/108
2024/0022161 A1* 1/2024 Nguyen ................. H02M 1/08

* cited by examiner

DYNAMIC SWITCHING SPEED CONTROL TO REDUCE LOSS, BEARING CURRENT AND ELECTROMAGNETIC INTERFERENCE

INTRODUCTION

The subject disclosure relates to the operation of inverters and, in particular, to a system and method for controlling the operation of a switch of the inverter to prevent the occurrence of voltage overshoot and/or current overshoot.

An inverter in a vehicle can be used to convert between a direct current (DC) voltage and an alternating current (AC) voltage. The inverter includes switches which can be turned on and off to coordinate this conversion. A switch can be a transistor. A gate driver can provide a signal to a gate of the transistor to turn the transistor on and off, thereby either allowing or preventing a current flow through the transistor. Faster switching times increase the amount of voltage overshoot and/or current overshoot through the transistor, which can lead to bearing current through a motor, electromotive ringing, and higher stresses on the transistor. Accordingly, it is desirable to provide a method of turning on and off switches that optimizes the occurrence of voltage and current overshoot while also keeping the losses to a minimum at certain operating points.

SUMMARY

In one exemplary embodiment, a method of operating a vehicle is disclosed. A gate current is applied to a switch of an inverter of the vehicle at a first on-current control level during a first switch-on stage of a turn-on operation of the switch. The gate current is lowered to a second on-current control level less than the first on-current control level during a second switch-on stage of the turn-on operation. The gate current is raised to a third on-current control level during a third switch-on stage of the turn-on operation, wherein the third on-current control level is greater than the second on-current control level.

In addition to one or more of the features described herein, the method further includes lowering the gate current to the second on-current control level when a drain-source current of the switch reaches a nominal maximum value to reduce an overshoot of the drain-source current at an end of the first switch-on stage.

In addition to one or more of the features described herein, the method further includes raising the gate current to the third on-current control level when a drain-source voltage is equal to or close to zero.

In addition to one or more of the features described herein, the method further includes turning off the switch by applying the gate current to the switch at a first off-current control level during a first switch-off stage until a gate-source voltage drops to an intermediate voltage level.

In addition to one or more of the features described herein, the method further includes applying the gate current to the switch at a second off-current control level during a second switch off stage until a drain-source current begins to fall from a maximum value.

In addition to one or more of the features described herein, the method further includes applying the gate current to the switch at a third off-current control level during a third switch off stage until the gate-source voltage is equal to or close to zero.

In addition to one or more of the features described herein, the method further includes selecting a switching speed for the switch based on at least one of a temperature of the switch, an amplitude of an inverter current at which the switching occurs, and an operating region of the vehicle.

In another exemplary embodiment, a system for controlling a vehicle is disclosed. The system includes an inverter and a gate controller. The inverter has a switch for controlling current to a motor of the vehicle. The gate controller is configured to apply a gate current to the switch at a first on-current control level during a first switch-on stage of a turn-on operation of the switch, lower the gate current to a second on-current control level less than the first on-current control level during a second switch-on stage of the turn-on operation, and raise the gate current to a third on-current control level during a third switch-on stage of the turn-on operation, wherein the third on-current control level is greater than the second on-current control level.

In addition to one or more of the features described herein, the gate controller is further configured to lower the gate current to the second on-current control level when a drain-source current of the switch reaches a nominal maximum value to reduce an overshoot of the drain-source current at an end of the first switch-on stage.

In addition to one or more of the features described herein, the gate controller is further configured to raise the gate current to the third on-current control level when a drain-source voltage is equal to or close to zero.

In addition to one or more of the features described herein, the gate controller is further configured to turn off the switch by applying the gate current to the switch at a first off-current control level during a first switch-off stage until a gate-source voltage drops to an intermediate voltage level.

In addition to one or more of the features described herein, the gate controller is further configured to apply the gate current to the switch at a second off-current control level during a second switch off stage until a drain-source current begins to fall from a maximum value.

In addition to one or more of the features described herein, the gate controller is further configured to apply the gate current to the switch at a third off-current control level during a third switch off stage until the gate-source voltage is equal to or close to zero.

In addition to one or more of the features described herein, the gate controller is further configured to select a switching speed for the switch based on at least one of a temperature of the switch, an amplitude of an inverter current at which the switching occurs, and an operating region of the vehicle.

In another exemplary embodiment, a vehicle is disclosed. The vehicle includes a motor, an inverter, and a gate controller. The inverter has a switch for controlling current to the motor. The gate controller is configured to apply a gate current to the switch at a first on-current control level during a first switch-on stage of a turn-on operation of the switch, lower the gate current to a second on-current control level less than the first on-current control level during a second switch-on stage of the turn-on operation, and raise the gate current to a third on-current control level during a third switch-on stage of the turn-on operation, wherein the third on-current control level is greater than the second on-current control level.

In addition to one or more of the features described herein, the gate controller is further configured to lower the gate current to the second on-current control level when a drain-source current of the switch reaches a nominal maximum value to reduce an overshoot of the drain-source current at an end of the first switch-on stage.

In addition to one or more of the features described herein, the gate controller is further configured to raise the gate current to the third on-current control level when a drain-source voltage is equal to or close to zero.

In addition to one or more of the features described herein, the gate controller is further configured to turn off the switch by applying the gate current to the switch at a first off-current control level during a first switch-off stage until a gate-source voltage drops to an intermediate voltage level.

In addition to one or more of the features described herein, the gate controller is further configured to apply the gate current to the switch at a second off-current control level during a second switch off stage until a drain-source current begins to fall from a maximum value and to apply the gate current to the switch at a third off-current control level during a third switch off stage until the gate-source voltage is equal to or close to zero.

In addition to one or more of the features described herein, the gate controller is further configured to select a switching speed for the switch based on at least one of a temperature of the switch, an amplitude of an inverter current at which the switching occurs, and an operating region of the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
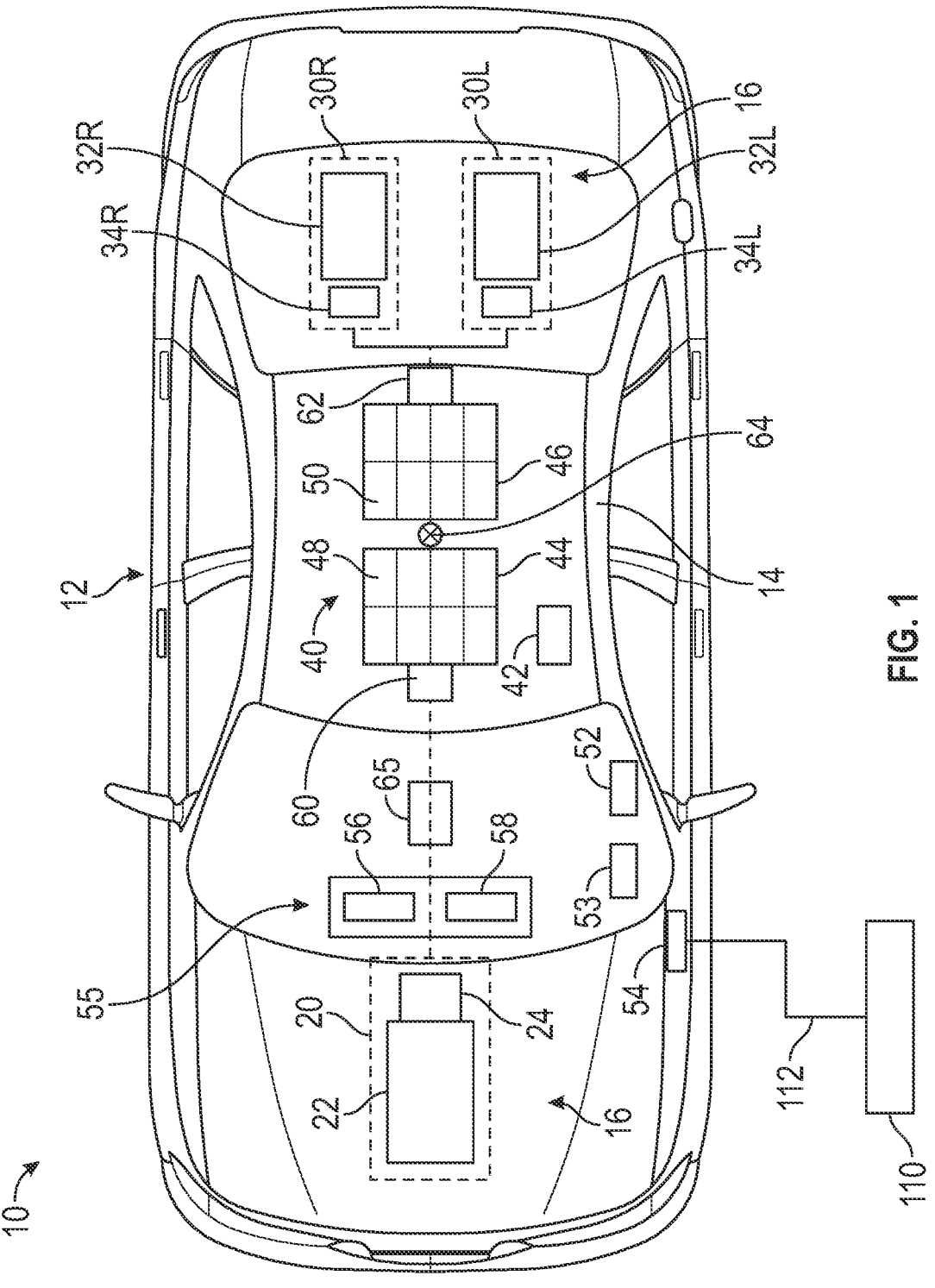
FIG. 1 shows an embodiment of a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an embodiment of a vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and others.

The vehicle 10 may be an electrically powered vehicle (EV), a hybrid vehicle or any other vehicle. In an embodiment, the vehicle 10 is an electric vehicle that includes multiple motors and/or drive systems. Any number of drive units may be included, such as one or more drive units for applying torque to front wheels (not shown) and/or to rear wheels (not shown). The drive units are controllable to operate the vehicle 10 in various operating modes, such as a normal mode, a high-performance mode (in which additional torque is applied), all-wheel drive ("AWD"), front-wheel drive ("FWD"), rear-wheel drive ("RWD") and others.

For example, the propulsion system 16 is a multi-drive system that includes a front drive unit 20 for driving front wheels, and rear drive units for driving rear wheels. The front drive unit 20 includes a front electric motor 22 and a front inverter 24 (e.g., front power inverter module or FPIM), as well as other components such as a cooling system. A left rear drive unit 30L includes a left rear electric motor 32L and a left rear inverter 34L. A right rear drive unit 30R includes a right rear electric motor 32R and a right rear inverter 34R. The front inverter 24, left rear inverter 34L and right rear inverter 34R (e.g., power inverter units or PIMs) each convert direct current (DC) power from a high voltage (HV) battery system 40 to poly-phase (e.g., two-phase, three-phase, six-phase, etc.) alternating current (AC) power to drive the front electric motor 22 the left rear electric motor 32L and the right rear electric motor 32R.

As shown in FIG. 1, the drive systems feature separate electric motors. However, embodiments are not so limited. For example, instead of separate motors, multiple drives can be provided by a single machine that has multiple sets of windings that are physically independent.

As also shown in FIG. 1, the drive systems are configured such that the front electric motor 22 drives the front wheels (not shown), and the left rear electric motor 32L and right rear electric motor 32R drive the rear wheels (not shown). However, embodiments are not so limited, as there may be any number of drive systems and/or motors at various locations (e.g., a motor driving each wheel, twin motors per axle, etc.). In addition, embodiments are not limited to a dual drive system, as embodiments can be used with a vehicle having any number of motors and/or power inverters.

In the propulsion system 16, the front drive unit 20, left rear drive unit 30L and right rear drive unit 30R are electrically connected to the battery system 40. The battery system 40 may also be electrically connected to other electrical components (also referred to as "electrical loads"), such as vehicle electronics (e.g., via an auxiliary power module or APM 42), heaters, cooling systems and others. The battery system 40 may be configured as a rechargeable energy storage system (RESS).

In an embodiment, the battery system 40 includes a plurality of separate battery assemblies, in which each battery assembly can be independently charged and can be used to independently supply power to a drive system or systems. For example, the battery system 40 includes a first battery assembly such as a first battery pack 44 connected to the front inverter 24, and a second battery pack 46. The first battery pack 44 includes a plurality of battery modules 48, and the second battery pack 46 includes a plurality of battery modules 50. Each battery module 48, 50 includes a number of individual cells (not shown). In various embodiments, one or more of the battery packs can include a MODACS (Multiple Output Dynamically Adjustable Capacity) battery.

Each of the front electric motor 22 and the left rear electric motor 32L and right rear electric motor 32R is a three-phase motor having three phase motor windings. However, embodiments described herein are not so limited. For example, the motors may be any poly-phase machines supplied by poly-phase inverters, and the drive units can be realized using a single machine having independent sets of windings.

The battery system 40 and/or the propulsion system 16 includes a switching system having various switching devices for controlling operation of the first battery pack 44 and second battery pack 46, and selectively connecting the first battery pack 44 and second battery pack 46 to the front drive unit 20, left rear drive unit 30L and right rear drive unit 30R. The switching devices may also be operated to selectively connect the first battery pack 44 and the second battery pack 46 to a charging system. The charging system can be used to charge the first battery pack 44 and the second battery pack 46, and/or to supply power from the first battery pack 44 and/or the second battery pack 46 to charge another energy storage system (e.g., vehicle-to-vehicle (V2V) and/or vehicle-to-everything (V2X) charging). The charging system includes one or more charging modules. For example, a first onboard charging module (OBCM) 52 is electrically connected to a charge port 54 for charging to and from an AC system or device, such as a utility AC power supply. A second OBCM 53 may be included for DC charging (e.g., DC fast charging or DCFC). As shown in FIG. 1, the utility AC power supply is a charging station 110 that is connected to the charge port 54 via a cord 112.

In an embodiment, the switching system includes a first switching device 60 that selectively connects to the first battery pack 44 to the front inverter 24, left rear inverter 34L and right rear inverter 34R, and a second switching device 62 that selectively connects the second battery pack 46 to the front inverter 24, left rear inverter 34L and right rear inverter 34R. The switching system also includes a third switching device 64 (also referred to as a "battery switching device") for selectively connecting the first battery pack 44 to the second battery pack 46 in series.

Any of various controllers can be used to control functions of the battery system 40, the switching system and the drive units. A controller includes any suitable processing device or unit, and may use an existing controller such as a drive system controller, an RESS controller, and/or controllers in the drive system. For example, a controller 65 may be included for controlling switching and drive control operations as discussed herein.

The controller 65 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 65 may include a non-transitory computer-readable medium that stores instructions which, when processed by one or more processors of the controller 65, implement a method of determining anode voltage and cathode voltage during charging and adjusting a charging rate of the vehicle based on the anode voltage and the cathode voltage, according to one or more embodiments detailed herein.

The vehicle 10 also includes a computer system 55 that includes one or more processing devices 56 and a user interface 58. The computer system 55 may communicate with the charging system controller, for example, to provide commands thereto in response to a user input. The various processing devices, modules and units may communicate with one another via a communication device or system, such as a controller area network (CAN) or transmission control protocol (TCP) bus.

As illustrated herein, the vehicle 10 is an electric vehicle. In an alternative embodiment, the vehicle 10 can be an internal combustion engine vehicle, a hybrid vehicle, etc.

Figure 2:
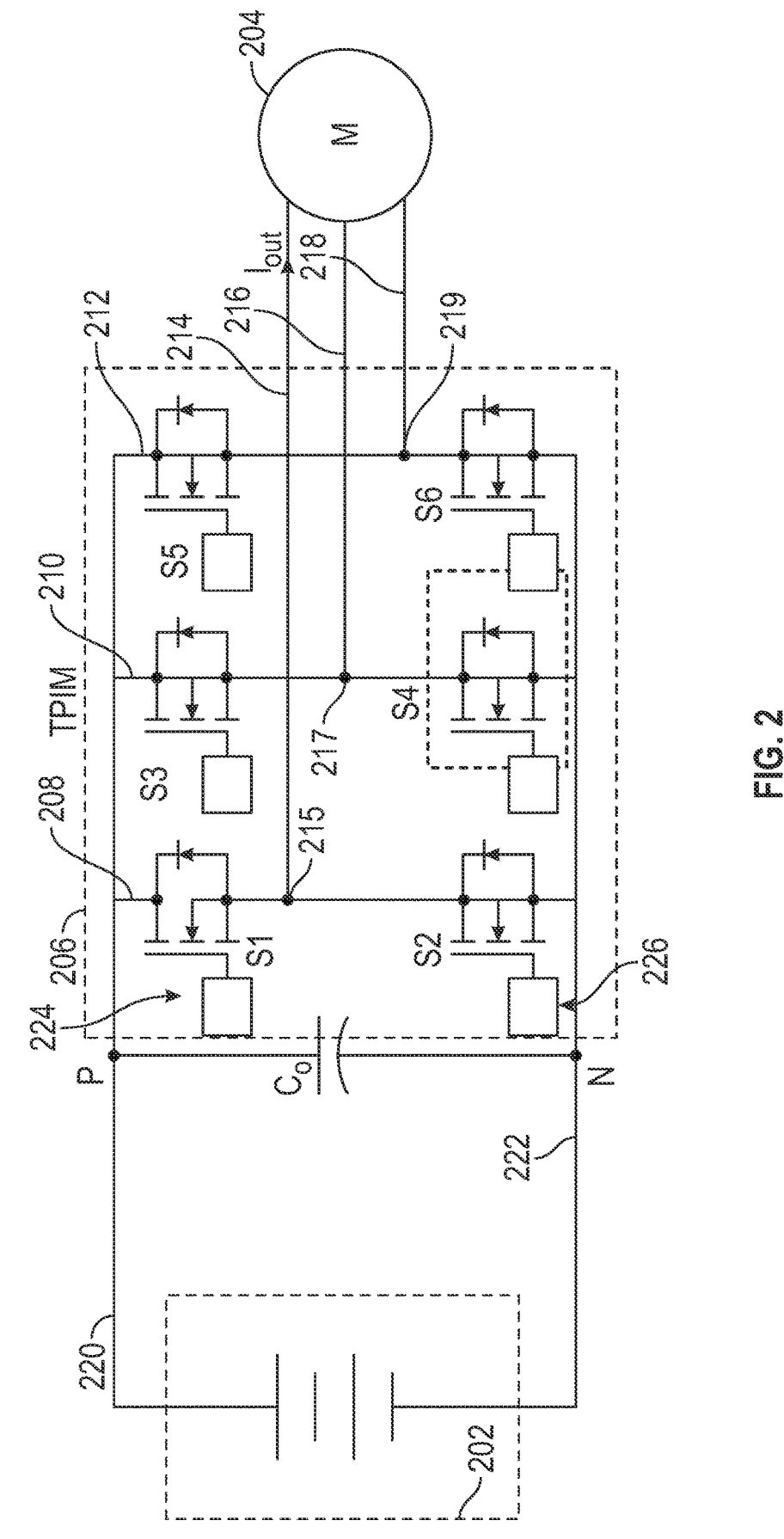
FIG. 2 shows a circuit diagram of an electrical system for the electric vehicle.

FIG. 2 shows a circuit diagram 200 of an electrical system for the electric vehicle. The electrical system includes a battery 202, a motor 204, and an inverter 206 that couples the battery to the motor. For illustrative purposes, the motor 204 is a three-phase motor. The inverter 206 includes three branches which connect to corresponding phase windings of the motor 204. A first branch 208 extends between a positive DC bus 220 and a negative DC bus 222 of the battery 202 and includes two switches S1 and S2. A first phase winding 214 of the motor 204 connects to the first branch 208 at a first AC terminal 215 between switch S1 and switch S2. A second branch 210 extends between the positive DC bus 220 and the negative DC bus 222 and includes two switches S3 and S4. A second phase winding 216 of the motor 204 connects to the second branch 210 at a second AC terminal 217 between switch S3 and switch S4. A third branch 212 extends between the positive DC bus 220 and the negative DC bus 222 and includes two switches S5 and S6. A third phase winding 218 of the motor 204 connects to the third branch 212 at a third AC terminal 219 between switch S5 and switch S6.

Each switch can be a transistor, such as a field-effect transistor (FET) having a drain, a source, and a gate. Each switch has a gate controller that controls a gate voltage or gate current at the FET, thereby controlling the state of the FET (i.e., ON or OFF). For example, a first gate controller 224 controls either the voltage or current at the gate of switch S1, and a second gate controller 226 controls either the voltage or current at the gate of switch S2.

Figures 3, 4:
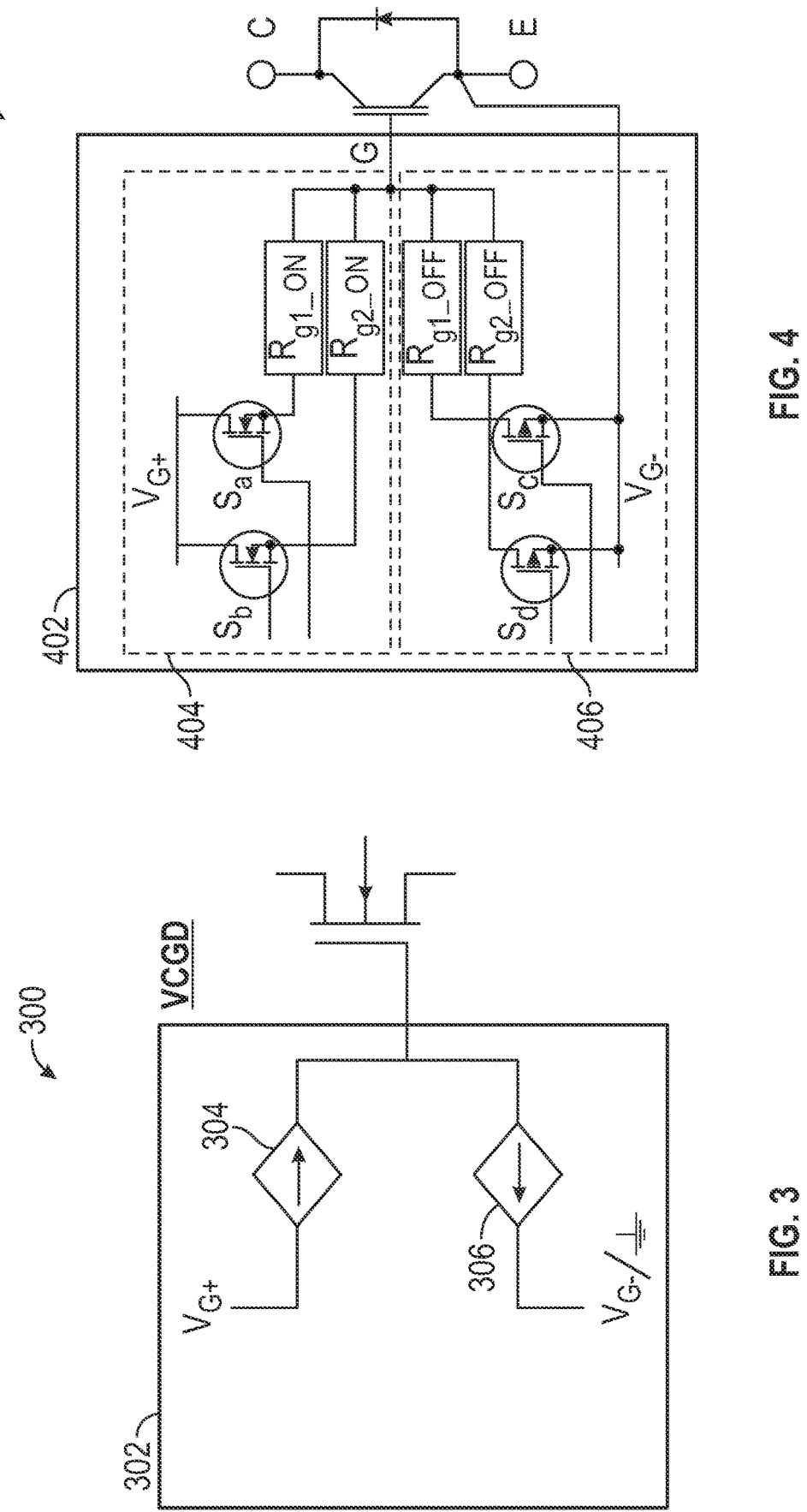
FIG. 3 shows a circuit diagram for a variable current gate controller for controlling operation of a switch/transistor of an inverter of the electrical system.
FIG. 4 shows a circuit diagram for the variable voltage gate controller for controlling operation of a switch/transistor of the inverter.

FIG. 3 shows a circuit diagram 300 for a variable current gate controller 302 for controlling operation of a switch/transistor of the inverter 206. The variable current gate controller 302 includes a first variable current source 304 and a second variable current source 306. The first variable current source 304 is connected to a positive bus and the second variable current source 306 is connected to a negative bus or to ground. The first variable current source 304 provides a gate current $I_g$ for controlling a "turn-on" operation at the switch. The second variable current source 306 provides a gate current $I_g$ for controlling a "turn-off" operation at the switch. The first variable current source 304 and the second variable current source 306 can be used independently of each other.

FIG. 4 shows a circuit diagram 400 for the variable voltage gate controller 402 for controlling operation of a switch/transistor of the inverter 206. The variable voltage gate controller 402 includes a first variable voltage source 404 and a second variable voltage source 406. The first variable voltage source 404 is connected to a positive voltage and the second variable voltage source 406 is connected to a negative voltage. The first variable voltage source 404 can include two or more voltage control transistors $S_a$, $S_b$ that can be independently turned on and off to provide a selected gate voltage suitable for turning on the switch. Similarly, the second variable voltage source 406 can include two or more voltage control transistors $S_c$, $S_d$ that can be independently turned on and off to provide a selected gate voltage for turning off the switch.

Figure 5:
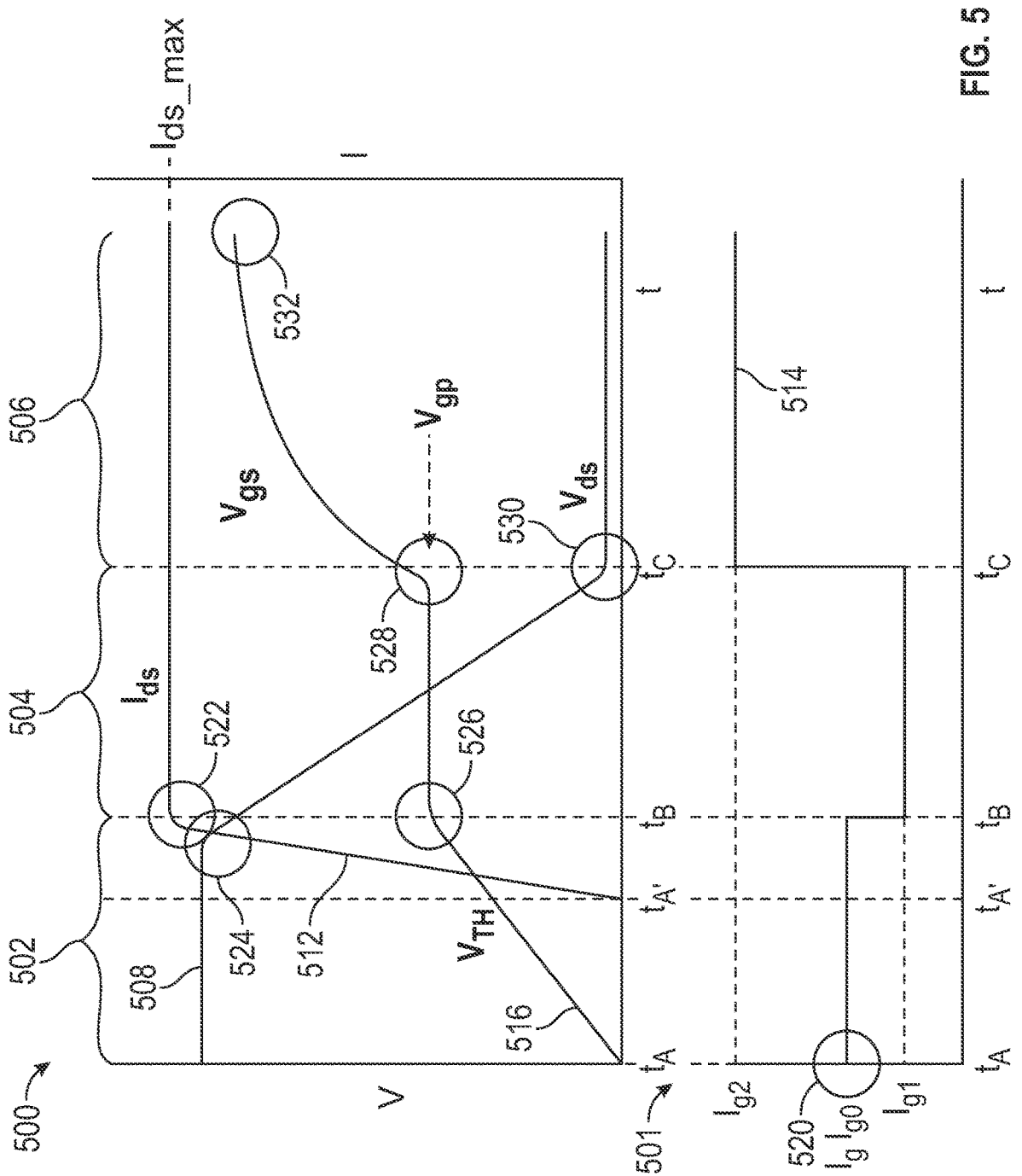
FIG. 5 shows a coordinated first graph and second graph depicting various electrical parameters of a switch of the inverter during a "turn-on" operation, in accordance with an illustrative embodiment.

FIG. 5 shows a coordinated first graph 500 and second graph 501 depicting various electrical parameters of a switch of the inverter 206 during a "turn-on" operation, in accordance with an illustrative embodiment. Time is shown along the abscissa. Electrical parameters of the switch are shown along the ordinate axis.

Stages of the "turn-on" operation are labelled along the abscissa. A first switch-on stage 502 extends from a first time $t_A$ to a second time $t_B$. A second switch-on stage 504 extends from the second time $t_B$ to a third time $t_C$. A third switch-on stage 506 occurs after the third time $t_C$. The electrical parameters include a drain-source voltage 508 ($V_{DS}$), a gate-source voltage 516 ($V_{GS}$), a drain-source current 512 ($I_{DS}$) (shown on first graph 500) and a gate current $I_g$ (514) (shown on second graph 501). In the initial OFF state, the drain-source current $I_{DS}$ is zero, the gate-source voltage $V_{GS}$ is at the turn-off voltage (which can be zero or a negative voltage), and the drain-source voltage $V_{DS}$ is at a nominal maximum value. The gate current $I_g$ is set to zero. The gate controller provides the gate current $I_g$ which controls the operation of the other electrical parameters (i.e., $V_{DS}$, $V_{GS}$, $I_{DS}$). For illustrative purposes, the gate controller is discussed herein as the variable current gate controller 302. However, the variable voltage gate controller 402 can be used in alternative embodiments.

The first switch-on stage 502 commences (at time $t_A$) when the variable current gate controller 302 sets the gate current $I_g$ to a first gate on-current level ($I_{g0}$). The gate-source voltage $V_{GS}$ rises from zero at this time. When the gate-source voltage $V_{GS}$ rises above a voltage threshold VTH (at time $t_{A'}$), the drain-source current $I_{DS}$ begins to rise from zero. The first switch-on stage 502 ends when the drain-source current $I_{DS}$ reached a set maximum value $I_{DS\_max}$.

At the beginning of the second switch-on stage 504, the variable current gate controller 302 lowers the gate current $I_g$ from the first on-current control level $I_{g0}$ to a second on-current control level $I_{g1}$. The switching speed is directly proportional to the gate current. Thus, having a high first gate-on-current level $I_{g0}$ during the first switch-on stage 502 results in an increased switching speed, which thereby reduces the switching loss without increasing the voltage slew rate (dVds/dt). Lowering the second gate-on current level $I_{g1}$ during the second switch-on stage 504 results in a reduced switching speed, which thereby decreases the voltage slew rate to reduce the occurrence of common mode current, electromagnetic interference, and bearing current. The drain-source current $I_{DS}$ remains at the set maximum level and the gate-source voltage $V_{GS}$ remains at an intermediate voltage level. The drain-source voltage $V_{DS}$ begins to decline from its nominal maximum value.

At the beginning of the third switch-on stage 506, the variable current gate controller 302 raises the gate current $I_g$ to a third on-current control level $I_{g2}$ which is greater than the second gate voltage level $I_{g1}$. The drain source voltage $V_{DS}$ reduces to zero while the drain source current $I_{DS}$ remains at the set maximum value. The gate-source voltage $V_{GS}$ rises to a maximum gate voltage value. During the third switch-on stage 506, the controller increases the gate current to the third switch-on level $I_{g2}$ to accelerate the $V_{gs}$ increment, which reduces the transistor channel resistance and therefore the switching loss.

During operation of the switch, the gate current $I_g$ can be measured and detected using shunt resistors or current sensors, the gate-source voltage $V_{GS}$ can be measured using a voltage sensor and the drain-source voltage $V_{DS}$ can be measures by measuring a resistive voltage across the transistor. The start of the first switch-on stage 502 can be detected when the variable current gate controller 302 receives a "turn-on" command (circle 520). The start of the second switch-on stage 504 can be detected by changes in the gate-source voltage $V_{GS}$, in the drain-source voltage $V_{DS}$ and in the drain-source current $I_{DS}$. In particular, the gate-source voltage $V_{GS}$ changes from having a positive slope to having a zero slope (circle 526). Alternatively, it can be detected that the gate-source voltage $V_{GS}$ is close to a Miller voltage for the transistor. In addition, the drain-source voltage $V_{DS}$ changes from having a zero slope to having a negative slope (circle 524). Additionally, the drain-source current $I_{DS}$ changes from having a positive slope to having a close-to-zero slope (circle 522). Alternatively, the drain-source current $I_{DS}$ is equal or close to the phase current of the switch.

The end of the second switch-on stage 504 can be detected by changes in the gate-source voltage $V_{GS}$ and the drain-source voltage $V_{DS}$. In particular, the gate-source voltage $V_{GS}$ changes from having a zero slope to having a positive slope (circle 528), causing the gate-source voltage $V_{GS}$ to rise above the Miller voltage of the transistor. Also, the drain-source voltage $V_{DS}$ changes from having a negative slope to having a zero slope, with the drain-source voltage $V_{DS}$ being equal or close to zero volts (circle 530). The end of the "turn-on" operation is detected when the gate-source voltage $V_{GS}$ reaches about the maximum gate voltage (circle 532).

Figure 6:
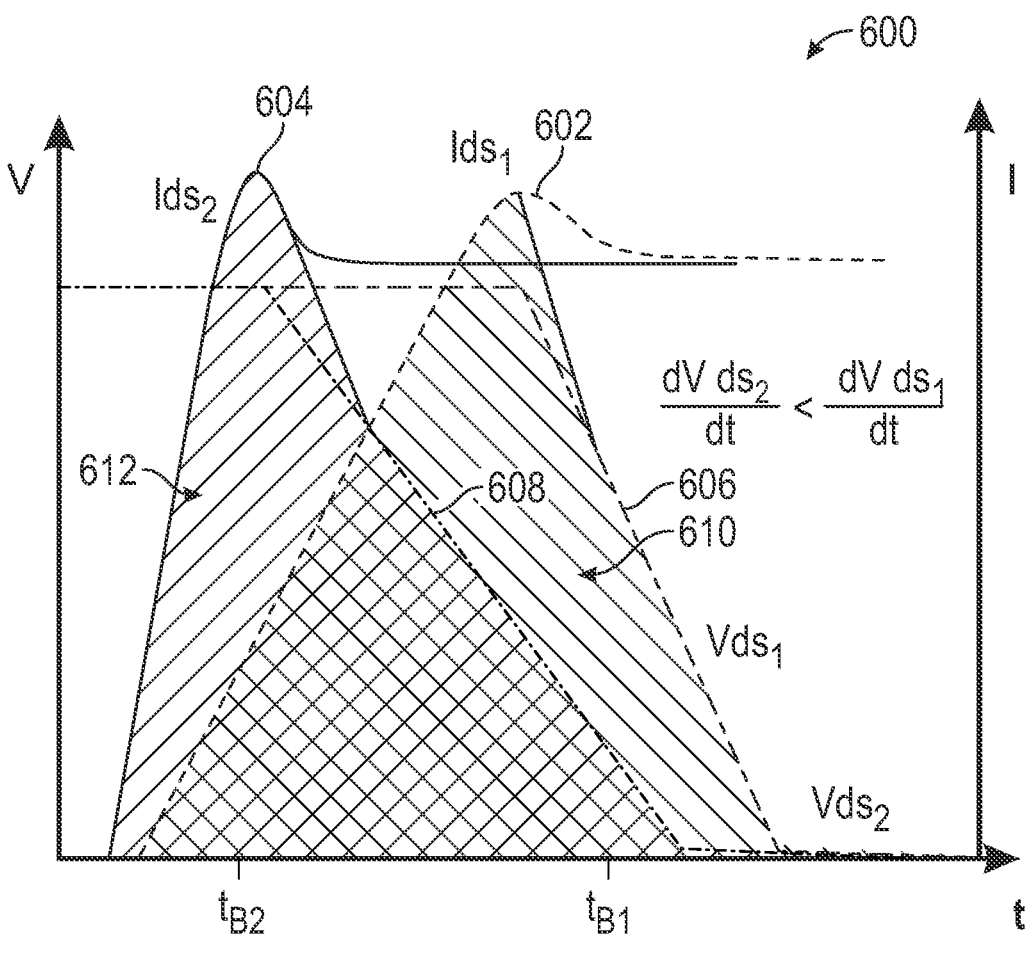
FIG. 6 shows a graph of switching power loss at different switch rates during the "turn-on" operation.

FIG. 6 shows a graph 600 of switching power loss at different switch rates during the "turn-on" operation. Time is shown along the abscissa. A first time marker $t_{B1}$ indicates a time of transition from the first switch-on stage 502 to the second switch-on stage 504 when the switch is operated at a first switch rate. A second time marker $t_{B2}$ shows a time of transition from the first switch-on stage 502 to the second switch-on stage 504 when the switch is operated at a second switch rate. Due to differences in the switch rates, the second time marker $t_{B2}$ precedes the first time marker $t_{B1}$. A first switch rate is indicated by the slope of the first drain-source current 602 prior to the first time marker $t_{B1}$. A second switch rate is indicated by a slope of the second drain-source current 604 prior to the second time marker $t_{B2}$. As seen in FIG. 6, as a result of the switching methods disclosed herein, the second switch rate is faster than the first switch rate (i.e., $dI_{DS2}/dt > dI_{DS1}/dt$). The slope ($dV_{DS2}/dt$) of the second drain-source voltage 608 after the second time marker $t_{B2}$ is less negative than the slope ($dV_{DS1}/dt$) of the first drain-source voltage 606 after the first time marker $t_{B1}$. In other words, the drain-source voltage changes more slowly for the second switch rate than for the first switch rate, reducing the common mode voltage and current, bearing current, and electromagnetic interference.

By alternating the "turn-on" operation so that the change in the drain source voltage is reduced, the switching power loss can be reduced. The first power loss of the first switch rate is indicated by first area 610 and the second power loss of the second switch rate is indicated by second area 612.

The second area 612 is less than the first area 610, so that the second switch rate has less power loss than the first switch rate.

Figure 7:
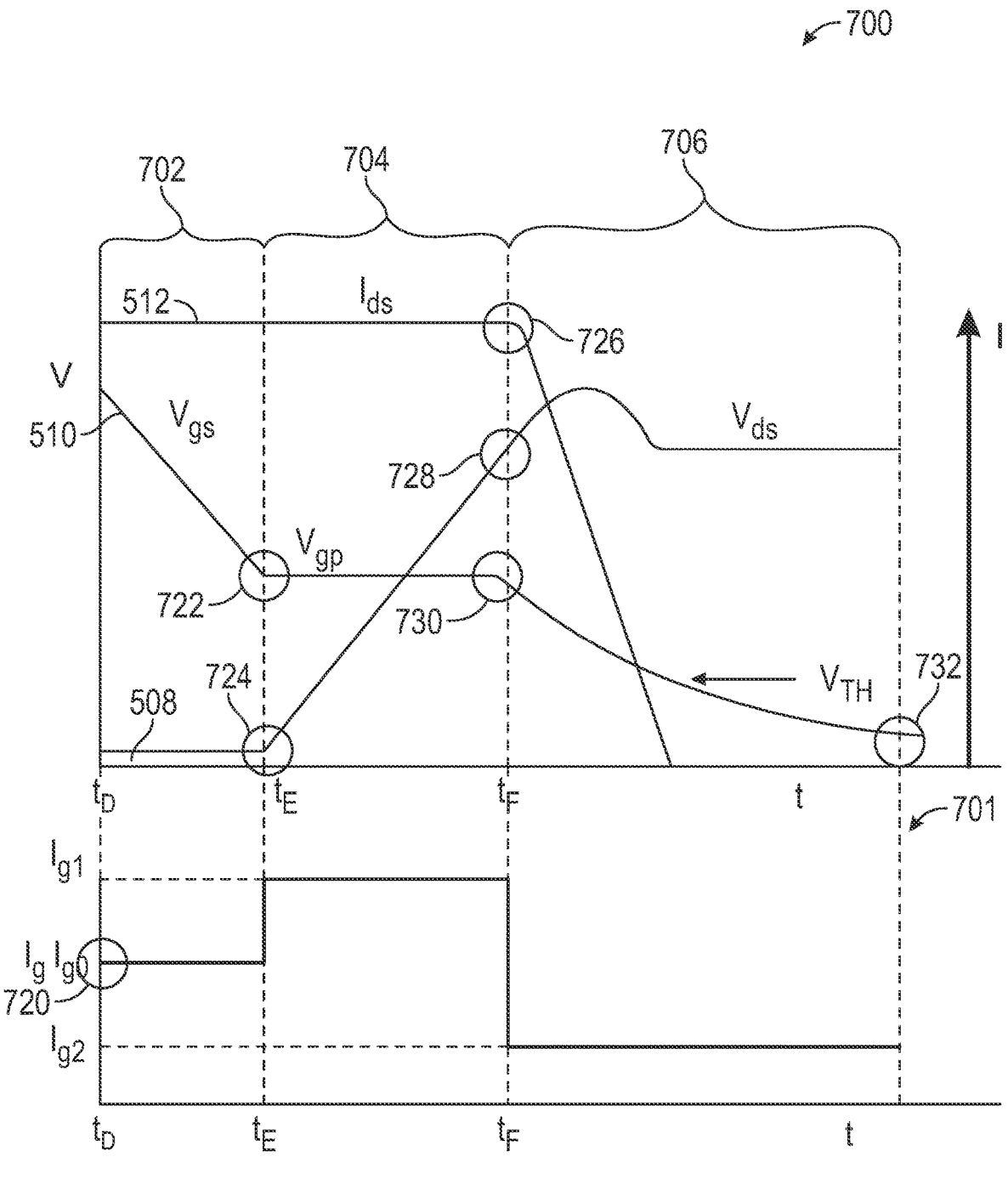
FIG. 7 shows a coordinated first graph and second graph depicting various electrical parameters of a switch of the inverter during a "turn-off" operation, in accordance with an illustrative embodiment.

FIG. 7 shows a coordinated first graph 700 and second graph 701 depicting various electrical parameters of a switch of the inverter 206 during a "turn-off" operation, in accordance with an illustrative embodiment. Time is shown along the abscissa. Electrical parameters of the switch are shown along the ordinate axis.

Stages of the "turn-off" operation are labelled along the abscissa. A first switch-off stage 702 extends from a first time $t_D$ to a second time $t_E$. A second switch-off stage 704 extends from the second time $t_E$ to a third time $t_F$. A third switch-off stage 706 occurs after the third time $t_F$. In the initial OFF state, the drain-source current $I_{DS}$ is at a nominal maximum level, the drain-source voltage $V_{DS}$ is at zero and the gate-source voltage $V_{GS}$ is at a nominal maximum value.

The first switch-off stage 702 commences (at time $t_E$) when the variable current gate controller 302 sets the gate current $I_g$ to a first off-current control level ($I_{g0}$). During the first switch-off stage 702, the drain-source current $I_{DS}$ and the drain-source voltage maintain their nominal ON values. The gate-source voltage $V_{GS}$ begins to drop from its nominal maximum level. The first switch-off stage 702 ends when the gate-source voltage $V_{GS}$ reaches an intermediate voltage value.

At the beginning of the second switch-off stage 704, the variable current gate controller 302 raises the gate current $I_g$ from the first off-current control level $I_{g0}$ to a second off-current control level $I_{g1}$. The drain-source voltage $V_{DS}$ begins to rise, while the gate-source voltage $V_{GS}$ remains at the intermediate voltage value and the drain-source current remains at its nominal ON value.

At the beginning of the third switch-off stage 706, the variable current gate controller 302 lowers the gate current $I_g$ to a third off-current control level $I_{g2}$ which is less than the second off-current control level $I_{g1}$. The drain source current $I_{DS}$ drops from its ON value during this switch-off stage and the drain-source voltage $V_{DS}$ begins to settle at an OFF voltage level. The drain-source voltage $V_{DS}$ can experience an overshoot of this level during the third switch-off stage 706. The gate-source voltage $V_{GS}$ begins to fall from the intermediate voltage level. The end of the "turn-off" operation occurs when the gate-source voltage $V_{GS}$ reaches a turn-off voltage (e.g., 0V, ~4V).

The beginning and ends of the switch-off stages are indicated by various measurable parameters. The start of the first switch-off stage (i.e., time $t_E$) occurs when a microcontroller sends an OFF command (circle 720). The start of the second switch-off stage 704 is detected by changes in the gate-source voltage $V_{GS}$, and in the drain-source voltage $V_{DS}$. In particular, the gate-source voltage changes $V_{GS}$ from having a negative slope to a zero slope (circle 722). Alternatively, the gate-source voltage $V_{GS}$ is equal or close to a Miller voltage for the transistor. In addition, the drain-source voltage $V_{DS}$ changes from having a zero slope to having a positive slope (circle 724), or increasing from its nominal minimum value.

The beginning of the third switch-off stage 706 is detected by changes in the gate-source voltage $V_{GS}$, in the drain-source voltage $V_{DS}$, and in the drain-source current $I_{DS}$. In particular, the drain-source current $I_{DS}$ changes from having a zero slope to a negative slope. Alternatively, the drain-source current $I_{DS}$ drops to less than the phase current of the switch, or dropping from its nominal maximum value. Also, the gate-source voltage $V_{GS}$ changes from having a zero slope to having a negative slope (circle 730), with the gate-source voltage $V_{GS}$ decreasing below the Miller voltage of the transistor. Also, the drain-source voltage $V_{DS}$ changes from having a positive slope to having a zero slope and the drain-source voltage $V_{DS}$ being equal or close to the DC voltage of the inverter (circle 728). The end of the switching OFF phase is detected when the gate-source voltage $V_{GS}$ is equal or close to zero (circle 732).

Figure 8:
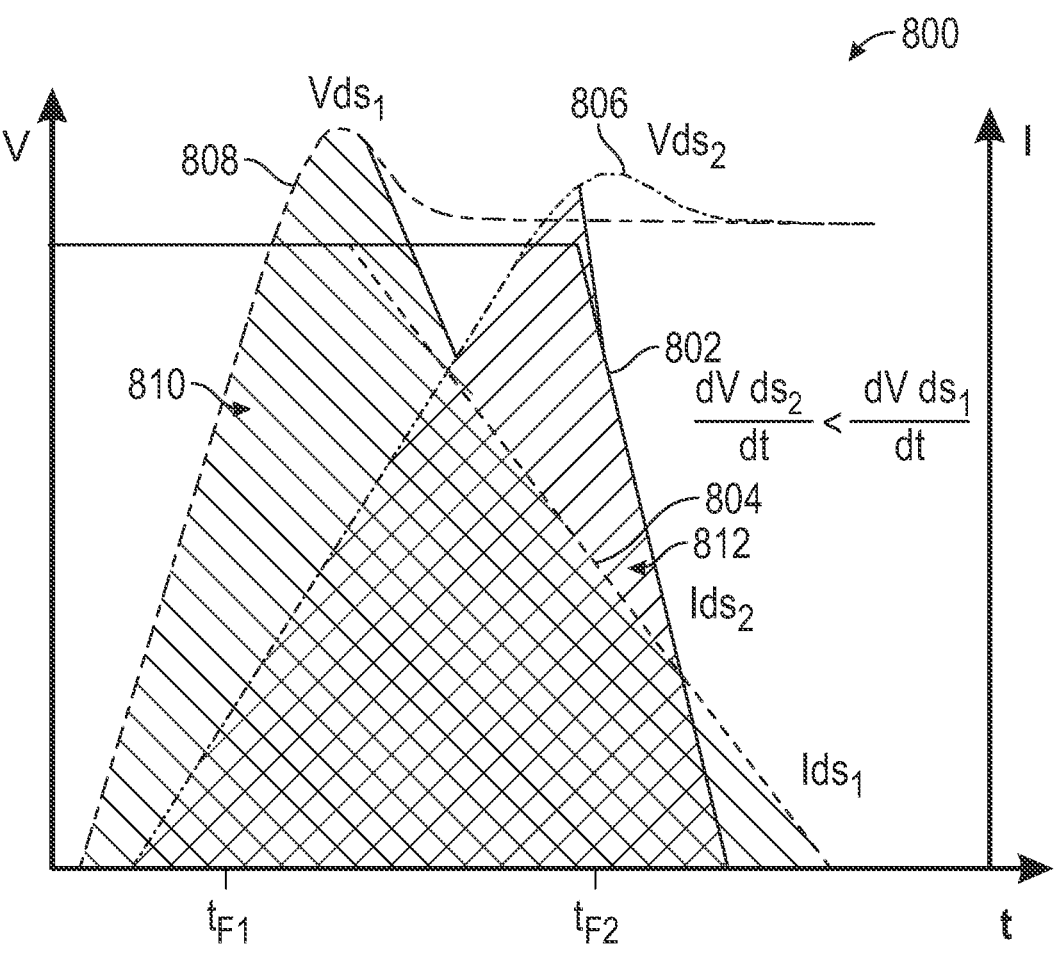
FIG. 8 shows a graph of switching power loss at different switch rates during a "turn-off" operation.

FIG. 8 shows a graph 800 of switching power loss at different switch rates during a "turn-off" operation. A first time marker $t_{F1}$ indicates a time of transition from the second switch-off stage 704 to the third switch-off stage 706 when the switch is operated at a first switch rate. A second time marker $t_{F2}$ shows a time of transition from the second switch-off stage 704 to the third switch-on stage 706 when the switch is operated at a second switch rate. Due to differences in the switch rates, the first time marker $t_{F1}$ precedes the second time marker $t_{F2}$. A first switch rate ($dI_{DS1}/dt$) is indicated by a slope of the first gate-source current 804 after the first time marker $t_{F1}$. A second switch rate ($dI_{DS2}/dt$) is indicated by a slope of the second gate-source current 802 after the second time marker $t_{F2}$. As a result of the switching methods disclosed herein, the second switch rate is faster than the first switch rate (i.e., $|dI_{DS2}/dt|>|dI_{DS1}/dt|$), as seen in FIG. 8, resulting in less switching power loss. The slope ($dV_{DS2}/dt$) of the second drain-source voltage 806 prior to the first time marker $t_{F2}$ is smaller (less positive) than the slope ($dV_{DS1}/dt$) of the first drain-source voltage 808 after the first time marker $t_{F1}$. In other words, the drain-source voltage changes more slowly for the second switch rate than for the first switch rate. The slower change in drain-source voltage results in less common mode voltage and current, bearing current, and electromagnetic interference. The first power loss of the first switch rate is indicated by first area 810 and the second power low for the second switch rate is indicated by second area 812. The second area 812 is less than the first area 810. Therefore, that the second switch rate has less switching power loss than the first switch rate. During the third switch-off stage 706, the controller lower $I_{g2}$ (increase its current amplitude) to accelerate the reduction in the gate-source voltage $V_{GS}$ to thereby reduce the leakage current through the transistor and decrease the switching loss.

The switching speed can be altered by changing parameters (i.e., the gate current) provided by the gate controller. The switching-off speed can be increased and the switching-on speed can be reduced when a temperature of the inverter increases, and vice versa. Also, switching speed can also be altered to coincide with a phase current at the corresponding leg of the inverter.

Figure 9:
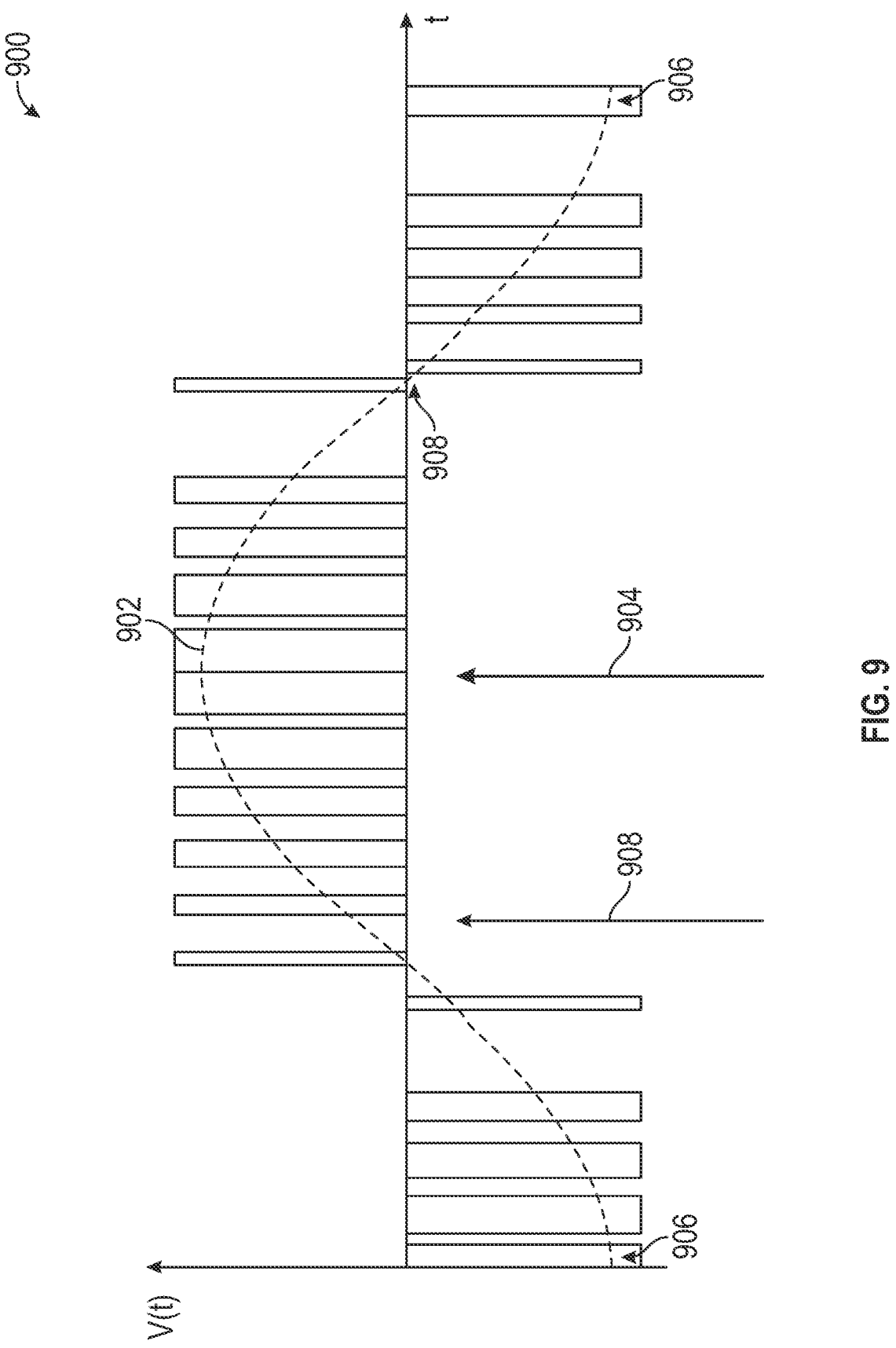
FIG. 9 shows a graph of a sinusoidal curve indicating an inverter current at the switch.

FIG. 9 shows a graph 900 of a sinusoidal curve 902 indicating an inverter current (i.e., drain-source current) at the switch. The majority of switching events occur when the inverter current is below its peak amplitude. The switching speed can be selected based on the amplitude of the inverter current at which the switching occurs. In particular, the switching-on speed can be fastest when the inverter current is at its extremum values, (i.e., at high 904 and at low 906) and can be slowest when the current is at values close to zero (i.e., points 908). The switching speed can be selected to match any particular amplitude of the inverter current.

Figure 10:
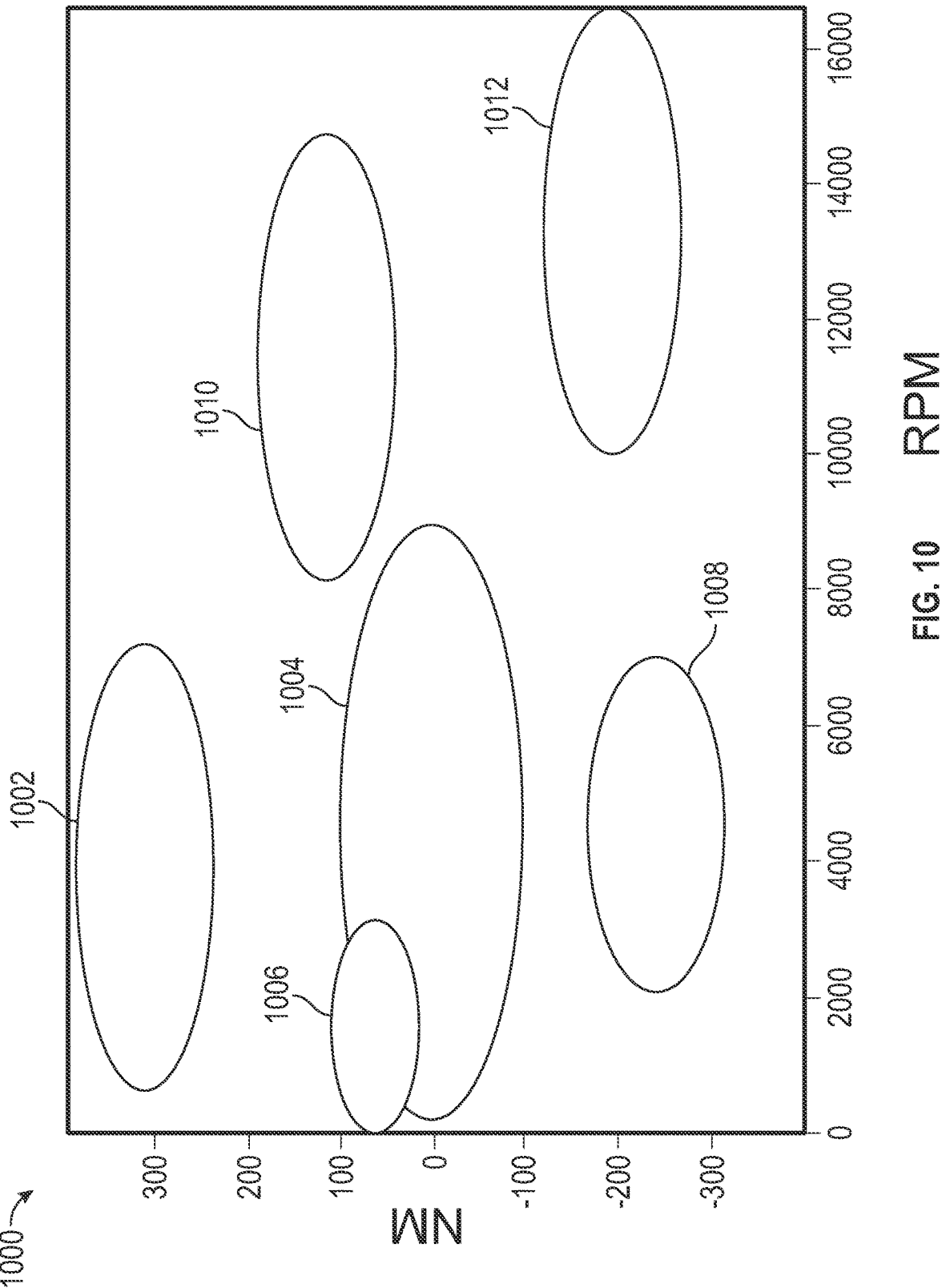
FIG. 10 shows a graph depicting various operating regions of the vehicle.

FIG. 10 shows a graph 1000 depicting various operating regions of the vehicle. Motor speed is shown along the abscissa in revolutions per minute (RPM) and motor torque is shown along the ordinate axis in Newton-meters (N-m). Each operating region has a corresponding switching speed that is suitable for the region. The graph includes a maximum torque region 1002, a normal driving region 1004, a bearing current damage region 1006, a regeneration driving region 1008, a high-speed driving region 1010 and a heating region 1012 in which the inverter is controlled to generate heat at the electric vehicle.

Table 1 shows a list of actions to be taken and corresponding changes that can be made to switching speeds to achieve the actions. The first column includes the change in operating condition; the second column includes a switch on speed; the third column includes a switch off speed.

| Condition change | Switch ON speed | Switch OFF speed |
| --- | --- | --- |
| Increase in battery voltage plus its ripple voltage | decrease | decrease |
| Increase in phase current | increase | decrease |
| Decrease in IGBT, MOSFET's junction temperature | decrease | decrease |
| Increase in IGBT, MOSFET junction temperature | increase | increase |
| Increase in gate source threshold voltage, $V_{TH}$ | increase | decrease |
| Increase in bearing current | decrease | decrease |
| Increase in EMI | decrease | decrease |
| Increase in reverse recovery | decrease | decrease |
| Increase in stray inductance | decrease | decrease |
| Increase in temperature of switch die or power module | decrease | decrease |

For example, if the phase current is to be increased, the controller increases the switching on speed and decreases the switching off speed.

Figure 11:
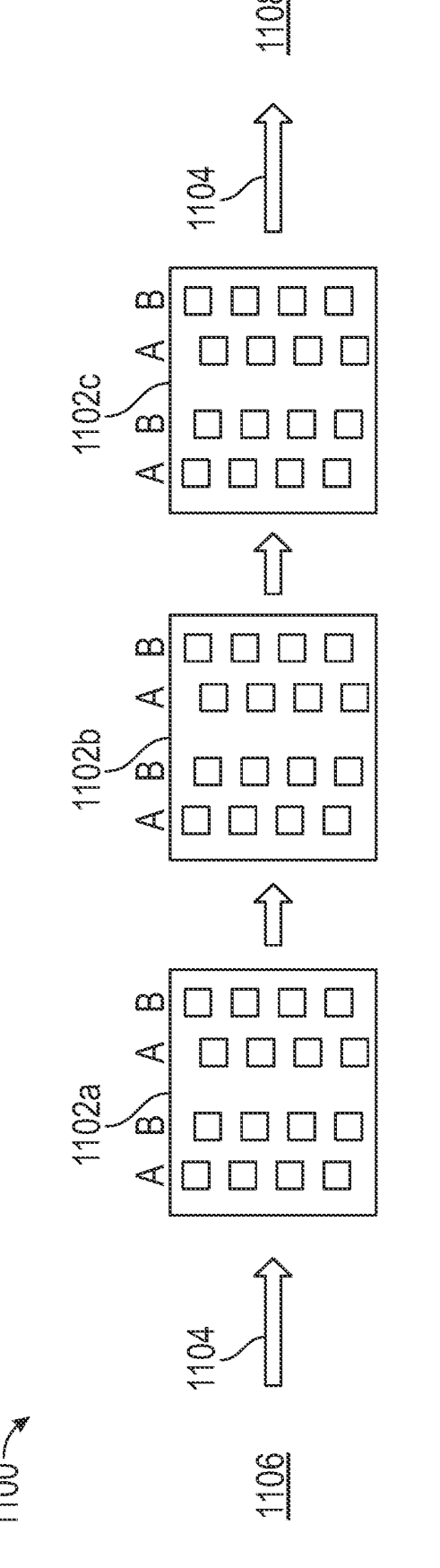
FIG. 11 shows a diagram of an inverter cooling system, in an illustrative embodiment.

FIG. 11 shows a diagram 1110 of an inverter cooling system, in an illustrative embodiment. The inverter cooling system includes a plurality of power modules 1102a-1102c disposed within coolant 1104. The coolant 1104 enters the system via an inlet 1106 and exits the system via an outlet 1108, absorbing heat from the plurality of power modules 1102a-1102c as it passes through the cooling system. Thus, the power module closest to the inlet 1106 (i.e., power module 1102a) is the coolest while power module further from the inlet (i.e., power module 1102c) is the hottest, with the temperature of each power module being related to its distance from the inlet.

The controller controls a switching speed of a switch based on the temperature of the switch. Thus, the switching speeds of the cooler power modules can be slower than the switching speeds of the hotter power modules. In other words, the switching speed of power module 1102a is slower than the switching speed of power module 1102c. This can also be stated that the switching speed is related to the distance of the switch to the inlet. Controlling the switching speed for each power module or switch can balance their temperature difference and therefore improve reliability.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:
applying a gate current to a switch of an inverter of the vehicle at a first on-current control level during a first switch-on stage of a turn-on operation of the switch;
lowering the gate current to a second on-current control level less than the first on-current control level during a second switch-on stage of the turn-on operation;
raising the gate current to a third on-current control level during a third switch-on stage of the turn-on operation, wherein the third on-current control level is greater than the second on-current control level; and
turning off the switch by applying the gate current to the switch at a first off-current control level during a first switch-off stage until a gate-source voltage drops to an intermediate voltage level.

2. The method of claim 1, further comprising lowering the gate current to the second on-current control level when a drain-source current of the switch reaches a nominal maximum value to reduce an overshoot of the drain-source current at an end of the first switch-on stage.

3. The method of claim 1, further comprising raising the gate current to the third on-current control level when a drain-source voltage is equal to or close to zero.

4. The method of claim 1, further comprising applying the gate current to the switch at a second off-current control level during a second switch off stage until a drain-source current begins to fall from a maximum value.

5. The method of claim 4, further comprising applying the gate current to the switch at a third off-current control level during a third switch off stage until the gate-source voltage is equal to or close to zero.

6. The method of claim 1, further comprising selecting a switching speed for the switch based on at least one of: (i) a temperature of the switch; (ii) an amplitude of an inverter current at which the switching occurs; and (iii) an operating region of the vehicle.

7. The method of claim 1, further comprising providing the gate current to the switch from a first variable current source during the turn-on operation and providing the gate current to the switch from a second variable current source during the turn-off operation.

8. A system for controlling a vehicle, comprising:

an inverter having a switch for controlling current to a motor of the vehicle; and a gate controller configured to apply a gate current to the switch at a first on-current control level during a first switch-on stage of a turn-on operation of the switch, lower the gate current to a second on-current control level less than the first on-current control level during a second switch-on stage of the turn-on operation, raise the gate current to a third on-current control level during a third switch-on stage of the turn-on operation, wherein the third on-current control level is greater than the second on-current control level, and turn off the switch by applying the gate current to the switch at a first off-current control level during a first switch-off stage until a gate-source voltage drops to an intermediate voltage level.

9. The system of claim 8, wherein the gate controller is further configured to lower the gate current to the second on-current control level when a drain-source current of the switch reaches a nominal maximum value to reduce an overshoot of the drain-source current at an end of the first switch-on stage.

10. The system of claim 8, wherein the gate controller is further configured to raise the gate current to the third on-current control level when a drain-source voltage is equal to or close to zero.

11. The system of claim 8, wherein the gate controller is further configured to apply the gate current to the switch at a second off-current control level during a second switch off stage until a drain-source current begins to fall from a maximum value.

12. The system of claim 11, wherein the gate controller is further configured to apply the gate current to the switch at a third off-current control level during a third switch off stage until the gate-source voltage is equal to or close to zero.

13. The system of claim 8, wherein the gate controller is further configured to select a switching speed for the switch based on at least one of: (i) a temperature of the switch; (ii) an amplitude of an inverter current at which the switching occurs; and (iii) an operating region of the vehicle.

14. The system of claim 8, further comprising a first variable current source configured to provide the gate current to the switch during the turn-on operation and a second variable current source configured to provide the gate current to the switch during the turn-off operation.

15. A vehicle, comprising:

a motor;

an inverter having a switch for controlling current to the motor; and a gate controller configured to apply a gate current to the switch at a first on-current control level during a first switch-on stage of a turn-on operation of the switch, lower the gate current to a second on-current control level less than the first on-current control level during a second switch-on stage of the turn-on operation, raise the gate current to a third on-current control level during a third switch-on stage of the turn-on operation, wherein the third on-current control level is greater than the second on-current control level, and turn off the switch by applying the gate current to the switch at a first off-current control level during a first switch-off stage until a gate-source voltage drops to an intermediate voltage level.

16. The vehicle of claim 15, wherein the gate controller is further configured to lower the gate current to the second on-current control level when a drain-source current of the switch reaches a nominal maximum value to reduce an overshoot of the drain-source current at an end of the first switch-on stage.

17. The vehicle of claim 15, wherein the gate controller is further configured to raise the gate current to the third on-current control level when a drain-source voltage is equal to or close to zero.

18. The vehicle of claim 15, wherein the gate controller is further configured to apply the gate current to the switch at a second off-current control level during a second switch off stage until a drain-source current begins to fall from a maximum value and to apply the gate current to the switch at a third off-current control level during a third switch off stage until the gate-source voltage is equal to or close to zero.

19. The vehicle of claim 15, wherein the gate controller is further configured to select a switching speed for the switch based on at least one of: (i) a temperature of the switch; (ii) an amplitude of an inverter current at which the switching occurs; and (iii) an operating region of the vehicle.

20. The vehicle of claim 15, further comprising a first variable current source configured to provide the gate current to the switch during the turn-on operation and a second variable current source configured to provide the gate current to the switch during the turn-off operation.

* * * * *